Oct. 6, 1959 V. A. VDOLEK 2,907,068
SHOE MOLDING MACHINES
Filed June 15, 1956 5 Sheets-Sheet 1

Fig. 1

Inventor
V. A. Vdolek
By Glascock Downing Liebold
Attys.

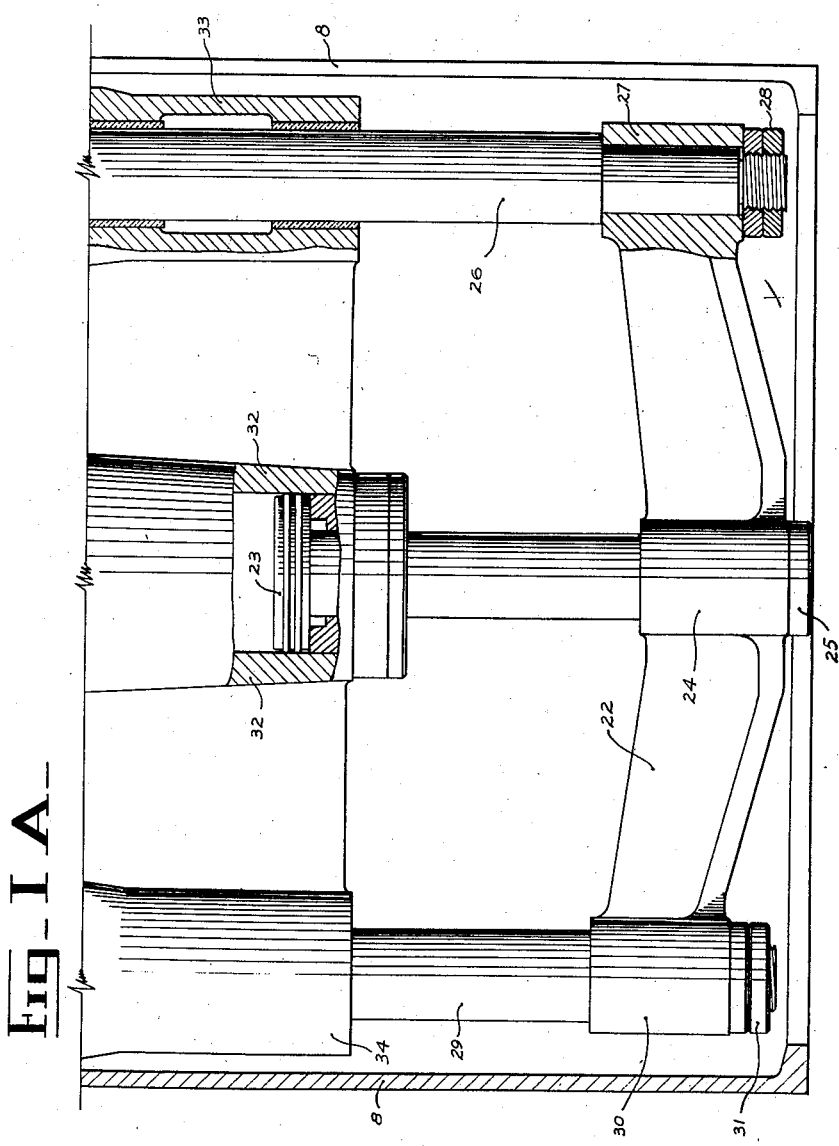
Fig. IA

Oct. 6, 1959 V. A. VDOLEK 2,907,068
SHOE MOLDING MACHINES
Filed June 15, 1956 5 Sheets-Sheet 3

Inventor
V. A. Vdolek
By Gusert Downing Seebold
Attys.

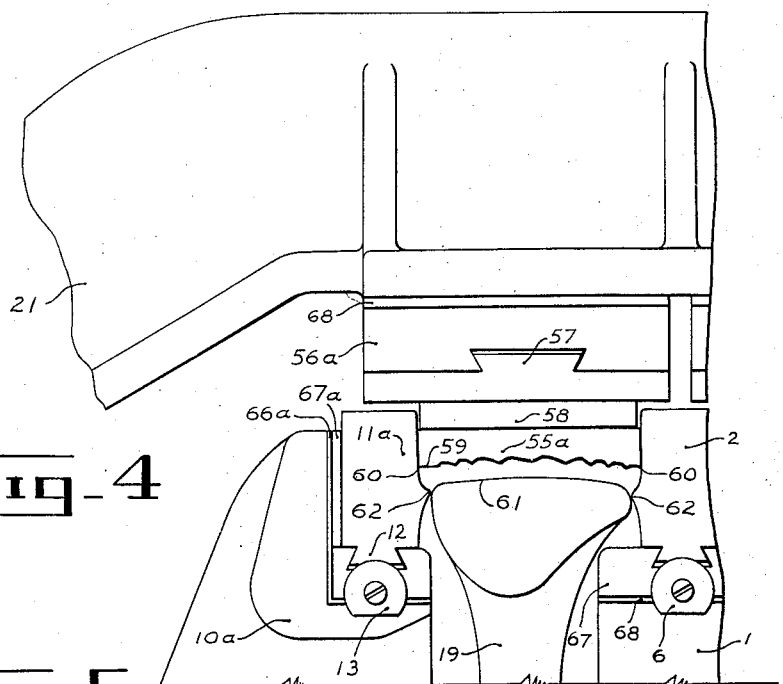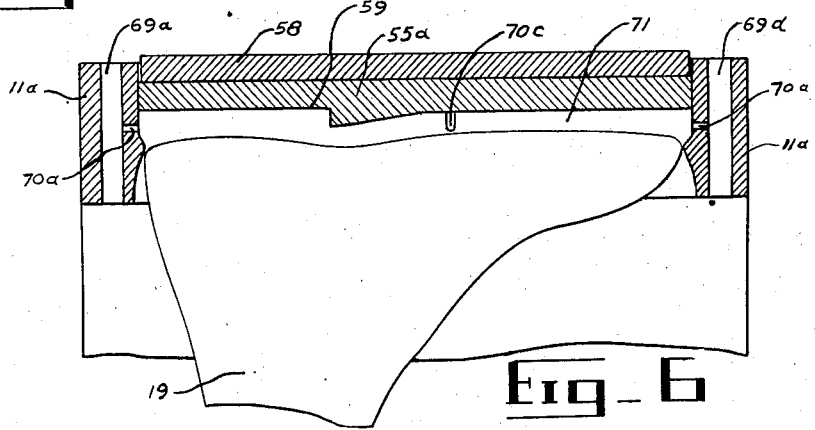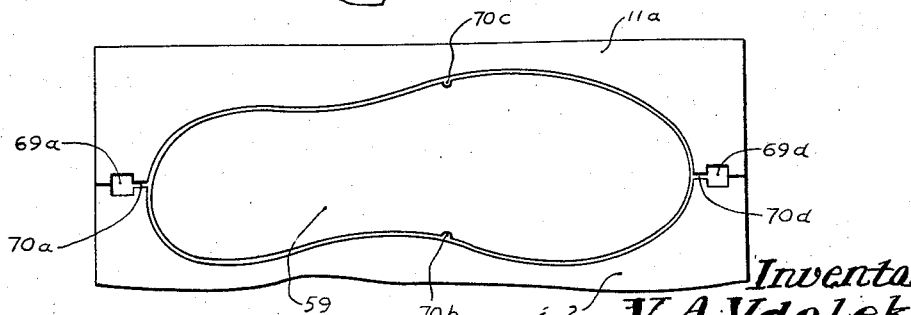

United States Patent Office 2,907,068
Patented Oct. 6, 1959

2,907,068

SHOE MOLDING MACHINES

Vladimir Alexander Vdolek, Batawa, Ontario, Canada, assignor to Bata Shoe Company of Canada Limited, Batawa, Ontario, Canada Application June 15, 1956, Serial No. 591,724

Claims priority, application Canada October 13, 1955

6 Claims. (Cl. 18—17)

The present invention relates to moulding machines, particularly of the type that mould hollow articles of rubber and plastic material, and to combination moulding and vulcanizing machines.

An object of this invention is to provide a machine of the character described having means to mould a plurality of articles simultaneously.

Another object of this invention is to provide mould sections that may be easily and quickly exchanged by the operator of the machine when moulds of a different size are desired.

Yet a further object of this invention is to provide thermal insulation for the purposes of reducing the pre-heating time of machines of the character described and of eliminating undue heating of unnecessary parts of the machine.

Yet a further object of this invention is to provide a machine of the character described in which a single center mould forms one side of each of two objects being moulded.

Still another object of this invention is to provide means whereby all of the mould sections do not meet together simultaneously during the moulding operation but, instead, the mould forming the bottom part of the article being moulded moves into position after the other mould sections are already in place, thus providing a guarantee that the material being moulded into the bottom of the object is sufficiently heated and softened so that it will fill every detail and crevice of the mould cavity. In a shoe moulding machine this feature eliminates putting a strip of unvulcanized rubber around the sole in order to form foxing of the shoe, into which the edges of the side moulds are cutting, leaving considerable waste of rubber outside the moulding cavity. This feature represents very considerable savings on rubber, furthermore, is eliminating the ridge of material which otherwise forms along the lines of juncture of the moulds and must later be cut or ground off.

Still another object of this invention is to provide overflow cavities to accommodate the excess moulding material that in the past has had to be trimmed from the moulded product.

In a machine for moulding shoes there are also the following objects:

To accomplish all advanced movements of the mould by means of low pressure fluid. After completion of the advanced stroke the high pressure is applied into the hydraulic cylinder thus closing upper mould finally, and accomplishing proper moulding eventually injecting under high pressure.

A further object of the invention is a positive stop of the upper mould to assure a constant and exact thickness of the sole.

Still another object of this invention is automatic movement of the lasts, i.e. out and into the moulding machine.

Other objects of this invention will in part be obvious and in part hereinafter pointed out.

Machines which now enjoy wide use in moulding and vulcanizing, for example of shoes, permit the formation of only one article at a time. In operation, it is known that one person is able to operate four machines and therefore produce four articles simultaneously. The present invention is a multiple moulding and vulcanizing machine which forms two or more articles simultaneously. It is now known that one person is able to operate three of these machines and thus make six articles at the same time.

In existing moulding and vulcanizing machines, the sections of the mould are commonly bolted in position, a time-consuming procedure, taking as long as one hour. The mould sections of the present invention are easily and quickly exchangeable, to facilitate changing the mould size or the thickness of the walls of the object being moulded.

Machines of this type now known waste electricity and produce excess heat in comparison with the present invention which is provided with thermal insulation which conserves from 50% to 60% of the electricity consumed by ordinary machines, eliminates undue excess heat, and also reduces the pre-heating time of the machine from three hours to 20 minutes.

Machines now in use leave ridges of the material being moulded along the lines at which the moulds meet. These ridges later have to be cut or ground off. The moulds in the present machine are equipped with special overflow chambers connected to the mould cavities by small passages. The amount of later trimming is thus substantially reduced, the operator merely having to clip the projecting excess material from three or four places on the moulded object rather than having to trim the entire perimeter of the object at the lines of juncture of the moulds.

In shoe moulding and vulcanizing machines, the removal of the moulded and vulcanized object from the machine is greatly facilitated by the present invention which provides means for automatically freeing the moulded object from all of the moulds, leaving the moulded and vulcanized object to be merely stripped from the last.

The present invention incorporates a number of safety features. Sliding transparent doors at the entrance to the moulding compartment must be completely closed before the operation of the press which drives the moulds can begin. Thus the operator's hands and all other objects must be free of the door before operation of the machine can begin. When the protective cover at the rear of the machine is opened, a switch is simultaneously opened which shuts off the power to the controls closing the press. A by-pass circuit is incorporated in the machine to facilitate installation or adjustment of the moulds or the mould-holders. This circuit operates the machine slowly and without full power. In the past it has been necessary to rotate the power drive slowly and laboriously by hand to determine that the moulds are in exact adjustment.

In the accompanying drawings,

Fig. 1 is a rear elevation, partly in section, of the top half of the machine with moulds in open position;

Fig. 1–A is a rear elevation, partly in section, of the bottom half of the machine in open position; Fig. 2 corresponds to Fig. 1 but shows the machine in closed position;

Fig. 4 is an enlarged sectional rear view of the left moulding section in closed position;

Fig. 5 is an enlarged sectional side view of one of the moulding sections in closed position showing overflow cavities;

Fig. 6 is an enlarged sectional top view of one of the moulding sections in closed position showing overflow cavities.

Figure 3:
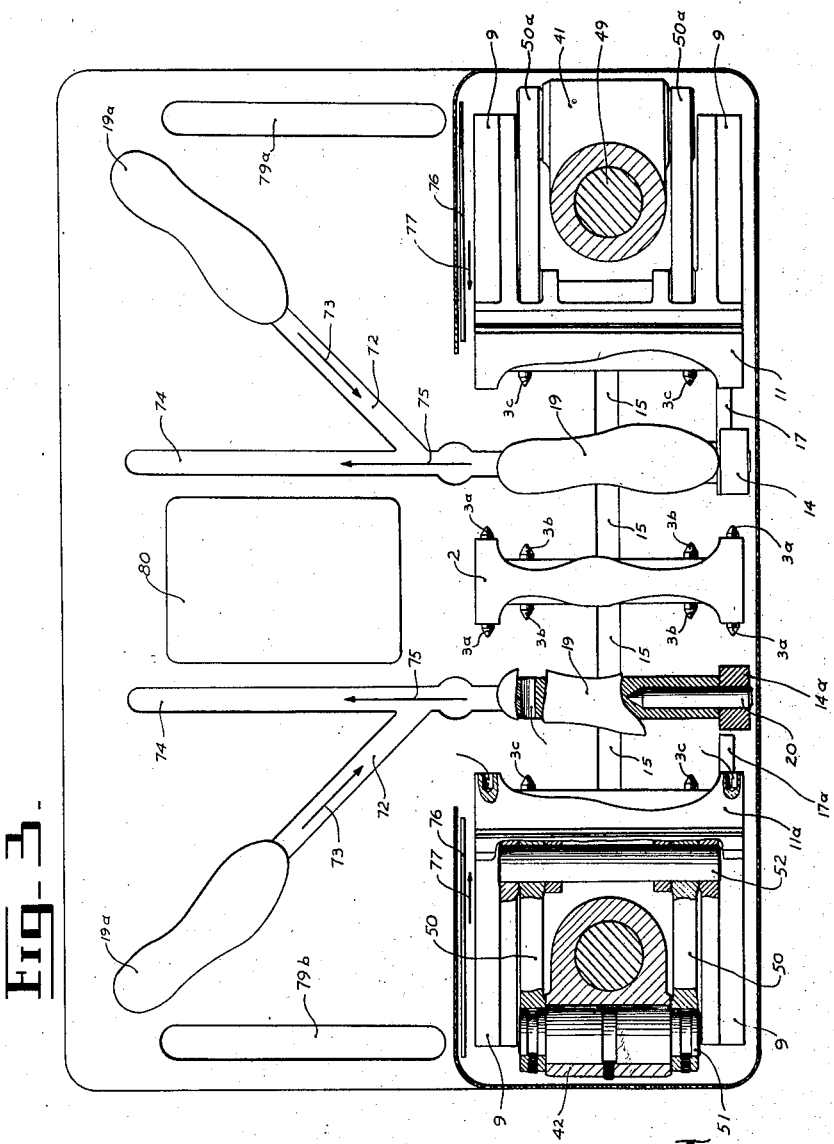
Fig. 3 is a top view of the machine with the top moulds cut away.

Referring to Figure 1, center mould-carrier member 1 carrying mould 2 suitably contoured as shown in Figure 3 to form side edges of articles being moulded. Mould pins 3 are fixedly mounted on mould member 2. Mould-carrier member 1 is suitably slotted as at 4 to receive prismatic lug 5 whereby mould 2 may be mounted on center mould member 1 and held in position by means of locking washer 6 or other means.

Center mould member 1 is mounted on platform 7 secured to a frame 8.

Side-mould carrier guides 9 are fixedly mounted on platform 7, each at a suitable distance from center mould carrier 1. Side mould carriers 10 and 10a are slidably mounted on guides 9 for movement in a horizontal direction. Side moulds 11 and 11a are mounted in fixed position on mould carriers 10 and 10a thermally insulated and like mould member 2 are suitably contoured, more or less as mirror images of the contours of moulds 2. Side moulds 11 have prismatic lugs 12 similar to lug 5 on mould member 1. The lugs 12 are mounted in slots and held in place by locking washers 13 or other means.

Situated between center mould 2 and side moulds 11 are last-carriers 14 and 14a slidably mounted on platform 7 for movement in a horizontal direction. The last-carriers are movable toward and away from center mould carrier member.

Plates 17 and 17a are mounted in horizontal position on last carriers 14, the plates 17 being provided with slots 18 and 18a and being movable with the last carriers 14 and 14a.

Lasts 19 are slidably secured to the last carriers 14 by means of pins 20, the pins being fixedly mounted on and projecting from the last carriers. See Figure 3.

The machine has two movable beams, an upper beam 21 and a lower beam 22. Referring now to Figure 1A, the lower beam 22 is carried by a power drive piston 23, being mounted thereon by means of collar 24 and nut 25. The ends of the lower beam are secured to columns 26 and 29 by means of collars 27 and 30 and nuts 28 and 31. Piston 23 rides in bearing cylinder 32, column 26 rides in bearing 33 and column 29 rides in bearing 34. The bearings are mounted on the underside of platform 7.

The ends of upper beam 21 are secured to the upper ends of columns 26 and 29 by means of collars 35 and 36 and nuts 37 and 38, as shown in Figure 1.

Mounted in bearings 33 and 34 are flanged bushings, one of which, 39, being shown in bearing 33. Bushing 39 has a flange 40 which serves as a seat for link holder 41.

Link holders 41 and 42 are slidably mounted on columns 26 and 29 respectively. Referring to link-holder 41, it will be seen that with the moulds in closed position the bottom edge 64 of link holder 41 is seated on flange 40 and that it is separated from shoulder 65 on a column 26 by a distance indicated by the arrow 63. The link holder 41 is machined at its upper end 43. The machined portion is guided in bushing 44 which is fitted into collar 35. The machined end 43 of link holder 41 has a shoulder 46 which serves as a seat for compression spring 47 contained in spring-cavity 48 formed in collar 35 about the upper end 49 of column 26.

Links 50 and 50a are pivotally attached at one end to link holder 41 and 42 respectively by eccentric link pins 51 and 51a, and at the other end to side mould carriers 10 and 10a by link pins 52 and 52a.

Fixedly attached to side mould carriers 10 and 10a are dogs 53 and 53a. The dogs 53 and 53a form a slidable connection with slotted plates 17 and 17a respectively.

Figure 2:
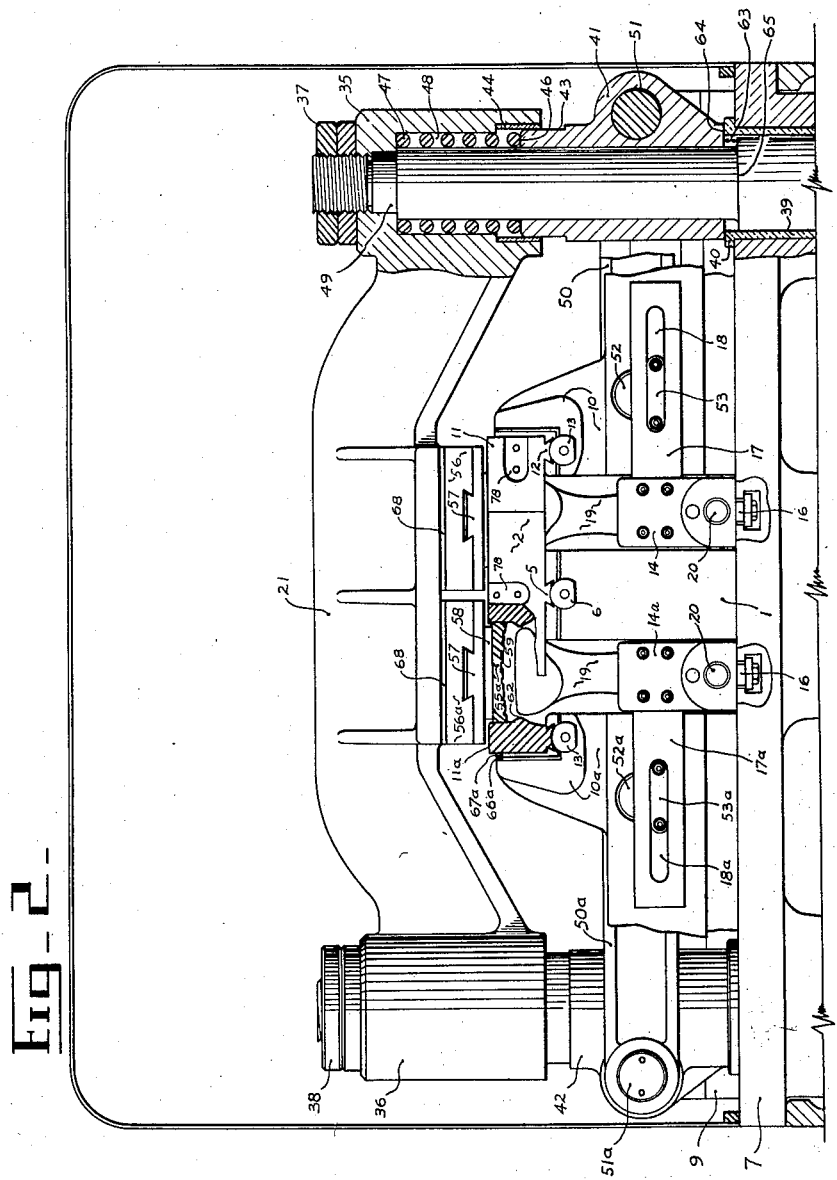

Referring in more detail to the moulds, it will be understood that when lasts 19, center mould 2 and side moulds 11 and 11a are positioned as in Figure 2 they will outline an open cavity or cavities having the general contours of sole elements for shoes.

The closing and defining of the sole cavity or cavities is the function of upper moulds indicated generally at 54. Upper moulds 55 and 55a are mounted in upper mould carriers 56 and 56a by means of lugs 57 similar to lugs 5 on mould member 1. If desired, moulds 55 and 55a may be spaced from mould carriers 56 and 56a by means of spacing elements 58 which may be of any desired thickness. Mould carriers 56 and 56a are fixedly attached to upper beam 21 and thermally insulated.

The upper moulds 55 and 55a are designed to fit precisely within the cavity outlined by center mould 2, side moulds 11 and 11a and lasts 19, and thereby define a cavity within which shoe sole elements may be moulded. The lasted upper 61 abuts a ledge 62 on the lower side and center moulds. These details will be best seen in the detailed enlargement shown in Figure 4.

Also seen in Figure 4 is thermal insulation 66a fastened between side mould carrier 10a and steel plates 67a. Thermal insulation is also situated both between upper beam 21 and upper mould carrier 56 and 56a, at 68, and at the top of center mould carrying member 1 beneath steel plate 67 at 68. It will be understood that in all cases the said insulation could be attached as satisfactorily between steel plates affixed to the moulds rather than between steel plates affixed to the mould carrying members as illustrated here.

Illustrated in Figure 5 and Figure 6 are overflow chambers 69a, and 69d and overflow passages 70a, 70b, 70c and 70d. Said chambers and passages are hollowed out portions of the mould faces so that when the moulds meet in closed position the chambers and passages are formed leading from the moulding cavity 71. As stated before, the overflow chambers 69a and 69d accommodate the excess moulding material that in the past has had to be trimmed from the moulded product. The size of the overflow passages 70 is regulated by the resistance which the material being moulded offers when passing through the said passages to the overflow chambers 69. This resistance should be such that the pressure developed inside the moulding cavity 71 is not reduced because of the outlets to the overflow chambers 69a and 69d.

The operation of the machine is as follows:

In Figure 3, the lasts 19a, covered with a pair of prepared uppers and with unvulcanized soles and foxing are slidably inserted along tracks 72 in the direction of arrows 73 into position between the open moulds, a second pair of vulcanized and moulded shoes having first been removed along tracks 74 in the direction of arrows 75. It is understood that only one pair of lasts can be used. When the starter button is pushed, safety shields 76 must close in the direction of arrows 77 before the moulding parts begin to close.

In Figure 1, the downward travel of the piston 23 accomplished by means of low pressure fluid is transferred through the lower beam 24, driven columns 26 and 29, to the upper beam 21. As the upper beam 21 begins to descend the top moulds 59, fixedly attached to the top beam 21, also begin to descend, and the side moulds 11 and 11a simultaneously begin to close due to the downward pressure of the compression springs 47 caused by the downward movement of collars 35 and 36 on link holder shoulder 46 (illustrated only once). Link holders 41 and 42 are thus moved in downward direction and by means of links 50 and 50a slide mould carrying members 10 and 10a toward the lasts 19. The lasts are carried toward the center mould 2 by last carrying members 14, which are pushed by closing last carrying parts 10 and 10a.

When the bottom shoulders of link holders 41 and 42, indicated at 64 in the case of link holder 41, comes to rest on flange 40 of bushing 39 the side moulds 11 and 11a will have closed against center mould 2 and around lasts 19. Driven columns 26 and 29 will travel the distance indicated in Figure 2 by arrow 63 after the side moulds 11, 11a and lasts 19 are in closed position, and the top moulds 59 will travel an equivalent distance at the same time to bring the moulds finally into closed position as in Figure 4. The travel indicated by 63, or part of it is accomplished by means of Hi-pressure fluid applied above piston 23. The delayed closing of the top moulds 59 is an assurance that the edges 62 have closed tight against the lasted uppers 61 before the moulding pressure caused when the top moulds are driven into position between the side and center moulds is applied.

It will be understood that as the top moulds move the final distance, equivalent to that indicated by arrow 63, that the compression spring 47 is compressed in spring cavity 48 between the top of said cavity 48 and the top shoulder 46 of link holder 41, and that the upper end 43 of link holder 41 remains stationary while collar 35, riding on bushing 44 descends a distance equivalent to distance 63.

When all of the moulds have closed, the vulcanizing process starts. Each of the moulds is directly heated by means of electric heating elements or a hi-frequency heating system thermostatically controlled (not shown). The electric heating circuit is completed by means of male-female type connectors which join when the moulds are inserted into the mould holders. The thermostatic controls 78 Figure 1 may be permanent or may be slidably exchanged from the rear of the moulds.

After a predetermined time allowed for moulding and vulcanizing, the machine is opened by automatic time controls. In operation from closed to open position, the driven columns 26 and 29 travel upward. As the said columns 26 and 29 first travel a distance equivalent to distance 63, the force of the compressed springs 47 will lift the upper beam 21 and hence the upper moulds 54 a similar distance, during which time the link holders 41 and 42 remain sitting on the bushings 40. Because the side mould link holders 41 and 42 have not moved, the side mould carrying members 10 and 10a and the side moulds 11 and 11a will also remain in closed position.

After the driven columns 26 and 29 have travelled the distance indicated by arrow 63, the shoulder indicated once at 65 makes contact with the bottom edge 64 of link holder 41 and lifts said link holder 41 off the flange 40. As the link holder 41 is lifted vertically, the link pin 51 also travels vertically while the inside link pin 52 travels horizontally away from center mould 2, being pulled by link 50, and carrying side mould carrying member 10 in a similar direction.

The dogs 53 and 53a, fixedly attached to side mould carrying members 10 and 10a now slide to the end of slots 18 and 18a which are farthest away from center mould member 1, thus freeing side moulds 11 and 11a from lasts 19. At this point, the last carrying members 14 and 14a begin to move away from center mould member 1, being pulled by plates 17 and 17a to which said last carrying members are fixedly attached. The total distance travelled by the last carrying members 14 and 14a is only enough to allow ample clearance between the lasts 19 and the center mould 2.

The upper moulds 54 continue moving in a vertical direction away from center mould 2 at the same time as the lasts 19 and the outside moulds 11 and 11a are pulled horizontally away from center mould 2.

When the top of the hydraulic piston 23 makes contact with the bottom of the cylinder, the machine will be in completely open position as illustrated in Figure 1.

At the stage when the machine is open, the lasts are moved out from the press on to the work table along tracks 74, either by hand or automatically.

The moulded and vulcanized shoes may now be stripped from the lasts 19.

Although the machine is shown herein as being used for moulding and vulcanizing shoes, it will be understood that the machine may also be used to mould and vulcanize other similar articles, it being merely necessary to change the contour of the moulds to produce the articles desired to be moulded and vulcanized.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

What I claim is:

1. A machine for moulding and vulcanizing footwear comprising in combination a frame, a stationary center mould section carrier supported within said frame, a slidably movable side mould section carrier on each side of said center mould carrier, a slidably movable last carrier between said stationary center mould section carrier and each of said slidably movable side mould section carriers, slotted plates fixedly attached to each of said last carriers and projecting toward said slidably movable side mould section carriers, a dog on each of said side mould section carriers projecting into the slot in each of said slotted plates, a plurality of bearings on said frame, each supporting a vertical movable vertical column, a horizontal beam fixedly attached to and connecting said vertical columns at their upper end, a second horizontal beam fixedly attached to and connecting said vertical columns at their lower end, a link holder fixedly attached to each of said vertical columns, a link pivotally attached at one end to each of said link holders and pivotally attached at its other end to each of said slidably movable side mould section carriers, two upper mould section carriers fixedly attached to the said upper horizontal beam, and drive means for said vertical columns.

2. A machine for moulding and vulcanizing footwear according to claim 1, prismatic grooves being provided in each of said mould carriers, and mould sections having projecting prismatic lugs slidably engageable in said prismatic grooves.

3. A machine for moulding and vulcanizing footwear according to claim 1, said upper beam being fixedly attached to said vertical columns and being separated from said link holders by spring members.

4. A machine for moulding and vulcanizing footwear according to claim 1, pins being provided in some of said mould sections and some of said mould section carriers, and holes in others of said mould sections and mould section carriers registerable with said pins.

5. A machine for moulding and vulcanizing footwear according to claim 2, each of said mould section carriers having thermo-insulating means.

6. A machine for moulding and vulcanizing footwear according to claim 1, overflow outlets being provided in said mould sections.

References Cited in the file of this patent

UNITED STATES PATENTS

| | | |
|---|---|---|
| 1,718,174 | Nielsen | June 18, 1929 |
| 2,476,272 | Bauman | July 19, 1949 |

FOREIGN PATENTS

| | | |
|---|---|---|
| 1,022,992 | France | Dec. 24, 1952 |
| 352,270 | Great Britain | July 9, 1931 |
| 714,932 | Great Britain | Sept. 8, 1954 |